April 7, 1953  F. M. PERKINS  2,633,806
HYDRAULIC TRANSMISSION
Filed Feb. 8, 1947  3 Sheets-Sheet 1
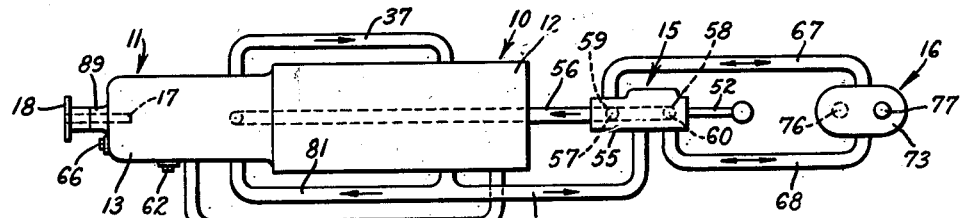
Fig. 1
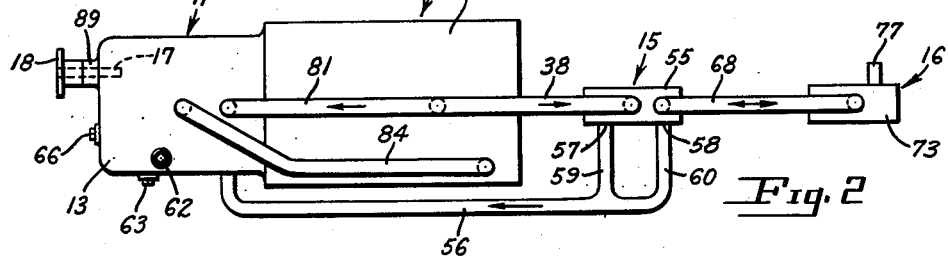
Fig. 2
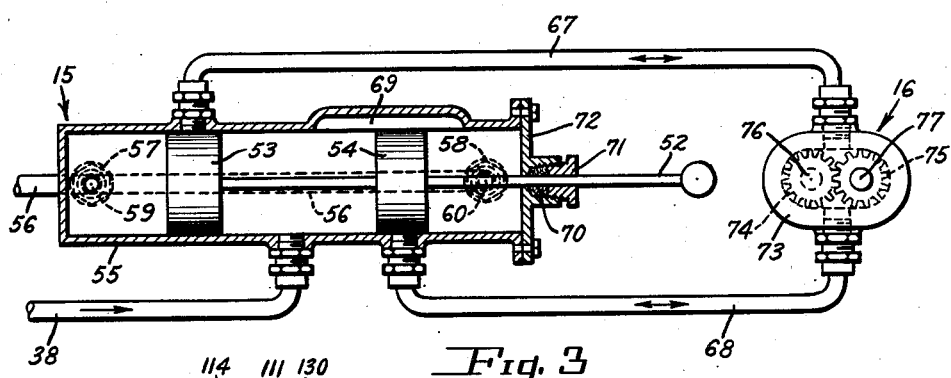
Fig. 3
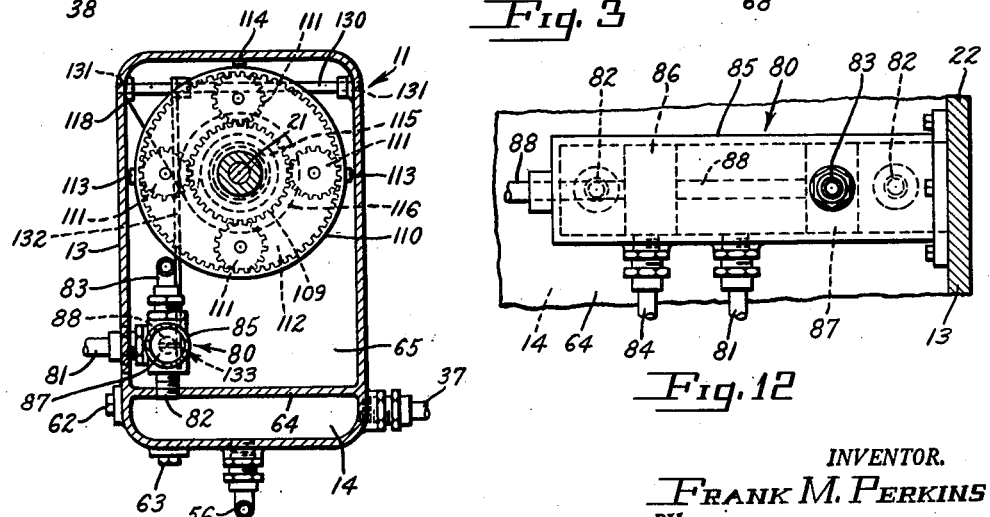
Fig. 11
Fig. 12
INVENTOR.
FRANK M. PERKINS
BY
John J. Hanrahan
ATTORNEY

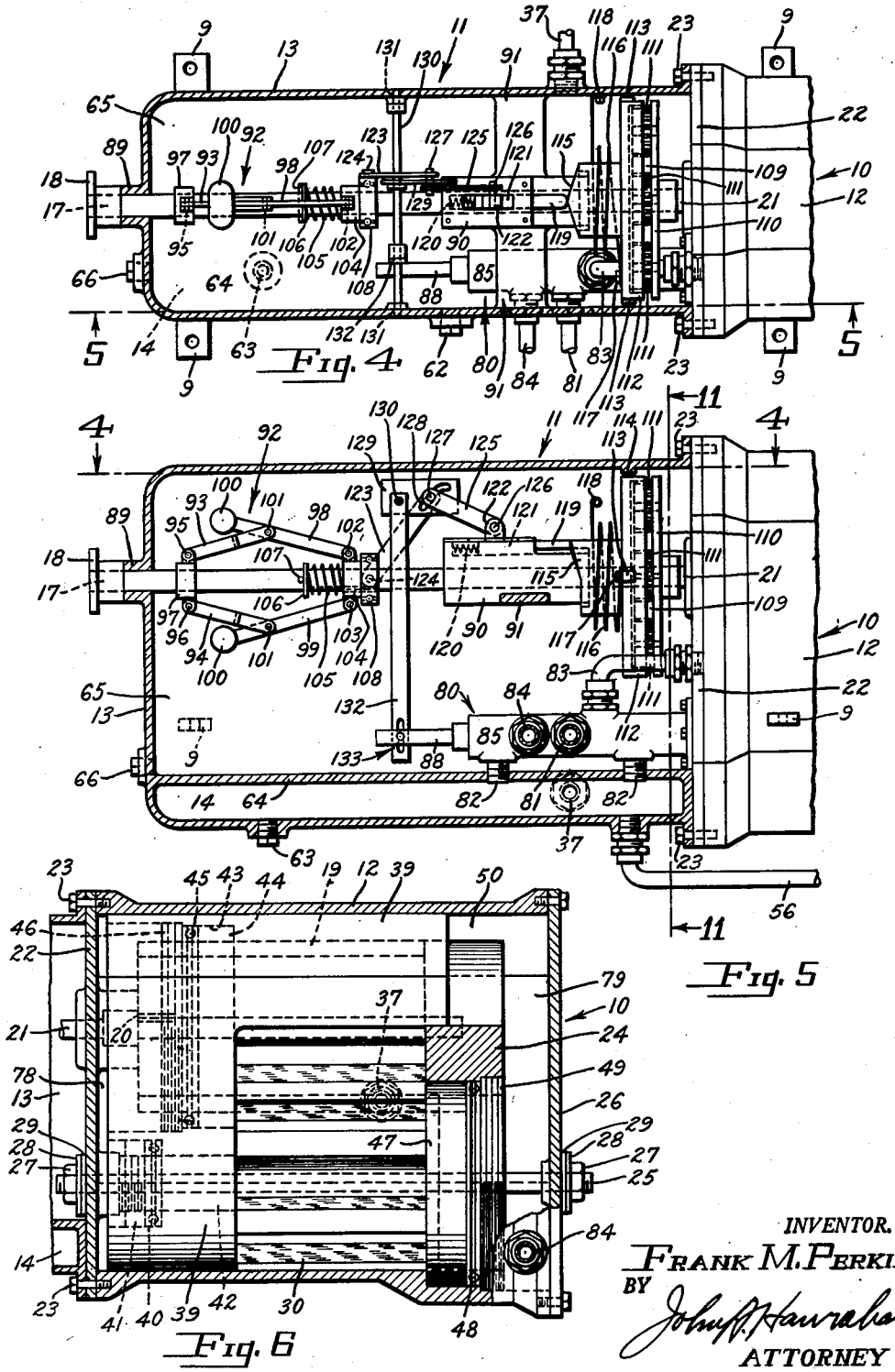

April 7, 1953 F. M. PERKINS 2,633,806
HYDRAULIC TRANSMISSION
Filed Feb. 8, 1947 3 Sheets-Sheet 3

INVENTOR.
FRANK M. PERKINS
BY
John F. Hanrahan
ATTORNEY

Patented Apr. 7, 1953

2,633,806

UNITED STATES PATENT OFFICE 2,633,806

HYDRAULIC TRANSMISSION

Frank M. Perkins, Long Beach, Calif.

Application February 8, 1947, Serial No. 727,431

9 Claims. (Cl. 103—120)

This invention relates to new and useful improvements in power transmissions and has particular relation to transmissions using a positive pressure type of hydraulic pump or motor with automatically controlled variable capacity to hydraulically drive or to be driven by another mechanism of fixed hydraulic capacity.

An object of the invention is to provide a positive drive hydraulic power transmission including a variable speed ratio which is entirely automatically controlled so as to insure that a prime mover is always operating under its most desirable combination of drive shaft torque and angular velocity for the particular power output required and that the transmission output shaft torque is always sufficient to meet the load requirements.

Another object is to provide a novel means of continuously altering the flow capacity of a positive pressure hydraulic pump or motor.

An additional object is to provide a novel means for controlling the varying or altering of the flow capacity of a positive pressure hydraulic pump or motor.

Other objects and advantages of the invention will become apparent from a consideration of the following detailed description taken in connection with the accompanying drawings wherein a satisfactory embodiment of the invention is shown. However, it is to be understood that the invention is not limited to the details disclosed but includes all such variations and modifications as fall within the spirit of the invention and the scope of the appended claims.

In the drawings:

Fig. 1 is a top plan view of the present transmission;

Fig. 2 is a side elevational view thereof;

Fig. 3 is an enlarged view partly in plan and partly in section showing a four-way valve and its connection to a mechanism of fixed hydraulic capacity;

Fig. 4 is a view looking from the top but with the upper portion of the casing removed whereby to show in plan a control unit for a variable capacity pump or motor, the view being taken as along the plane of the line 4—4 of Fig. 5;

Fig. 5 is a view somewhat similar to but at right angles to Fig. 4, the view being taken as along the plane of the line 5—5 of Fig. 4;

Fig. 6 is a view partly in section and partly in elevation of said variable capacity pump;

Fig. 11 is a vertical sectional view taken as along the plane of the line 11—11 of Fig. 5; and Fig. 12 is an enlarged top plan view of a valve employed in connection with the mechanism for controlling the altering or varying of the capacity flow of the variable capacity pump.

Figure 7:
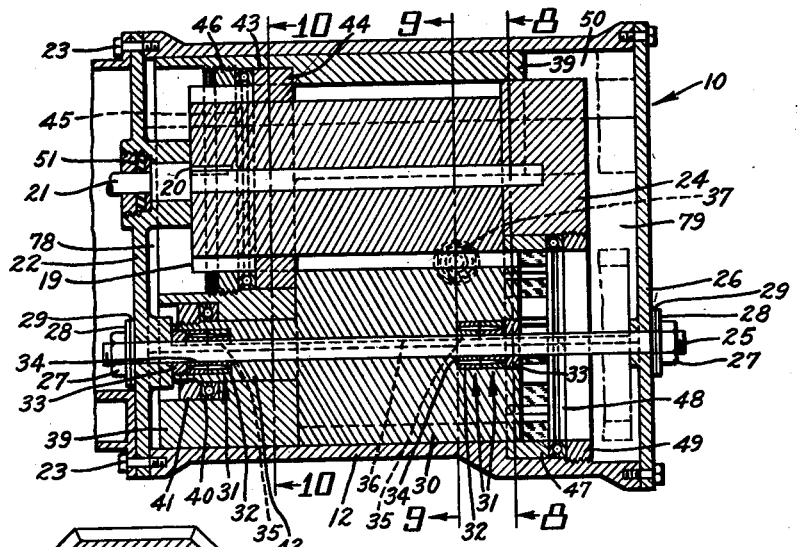
Fig. 7 is a central vertical longitudinal sectional view through said pump.

As used throughout this specification and claims, the word "capacity" as applied to a hydraulic pump or motor unit refers to the volume of flow per revolution of the revolving element or elements of said unit. The present transmission is made up of several units which may be placed in any of various related positions although the accompanying drawings and present description disclose but one of the possible arrangements.

As shown herein, a variable capacity hydraulic power unit in the form of a pump or motor 10 is provided and at one end, as the front end, of such unit there is located a control mechanism generally designated 11 for controlling and varying the capacity of the pump or motor 10. As herein shown, these units 10 and 11 are enclosed within casings 12 and 13 and the lower portion of the latter constitutes a storage sump 14 for the hydraulic fluid. A four-way control valve is generally indicated at 15 while at 16 is generally indicated a driven unit. While the units 10, 11, 15 and 16 are shown in a more or less straight line arrangement, it will be understood that the units 15 and 16 may be in some other location since they are connected with one another and with the units 10 and 11 only through piping constructions.

The manner in which the assembled units are supported on any suitable base, block or the like is not material, but as here shown, the casings 12 and 13 are provided with mounting lugs 9 for this purpose. The crank or drive shaft or the like of or from any suitable prime mover (not shown) is connected to drive shaft 17 comprising part of the control mechanism 11. Such connection may be made by bolting the prime mover crank or a shaft driven from the prime mover to a plate or flange 18 rigidly secured to or integral with the shaft 17. Because of this connection with the flange 18 or the like, the prime mover serves to drive the variable capacity pump 10 through the control unit 11. The details of this drive will later appear.

Variable capacity pump 10 (see particularly Figs. 6-9) within the casing 12 includes an elongated gear 19 keyed as at 20 on a shaft 21 having bearing at one end in an end wall or a separating wall or plate 22 located between the casings 12 and 13 and secured in place as by means of the bolts 23 securing said casings together. The other end of said shaft is mounted in a crosspiece 24 herein disclosed as integral with the vertical side walls of the casing 12. In this connection it will be understood that said crosspiece may be separately formed and bolted, welded or otherwise secured in place should such be desired. Further, it will be understood that any suitable construction of bearing means may be provided for the shaft 21.

In spaced relation to, but parallel with, the shaft 21 is a stationary rod 25 supported by the divider or separator plate 22 and a closure plate 26 located at the rear end of the pump and comprising the rear end wall of the casing 12. The rod 25 is rigidly attached to both plates 22 and 26 as by means of nuts 27 and washers 28. Gaskets 29 under such washers are drawn against the outer sides of the plates 22 and 26 on tightening of the nuts 27 whereby to prevent leakage of oil or other hydraulic medium from the housing about the rod 25.

Mounted on the rod 25 for sliding movement therealong is a gear 30 which meshes with the gear 19. Actually the gear 30 is mounted on bearings 31 whereby the gear is more freely slidable on the rod 25. These bearings are shown as two spaced tapered roller bearings, the outer races 32 of which are held in place in recesses by threaded retainers 33. The inner races 34 of said bearings are slidable along the rod 25 and are prevented from rotating, and thus causing excessive wear on said rod, by means of lugs 35 (Figs. 8-10) which are integral with said inner races and slide in a longitudinal groove 36 in said rod.

Figure 9:
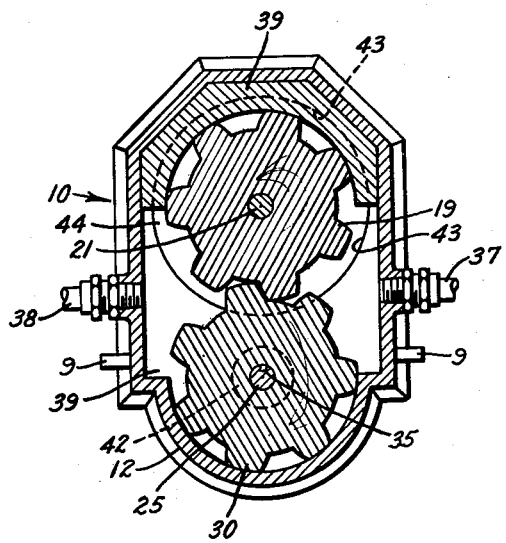
Fig. 9 is a vertical sectional view taken as along the plane of the line 9—9 of Fig. 7.
Figure 10:
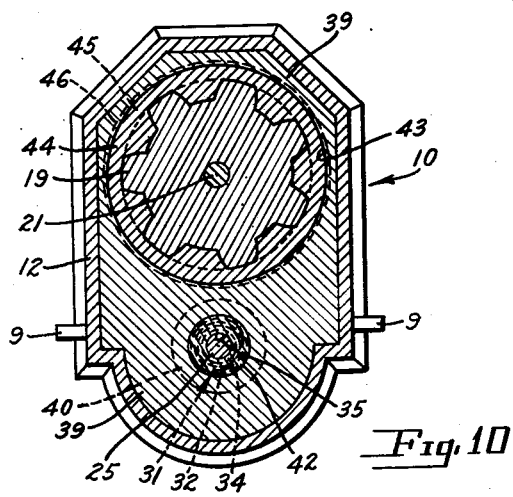
Fig. 10 is a vertical sectional view taken as along the plane of the line 10—10 of Fig. 7.

As shown best in Fig. 9, the pump 10 operates on the gear pump principle and therein it will be seen that rotation of the shaft 21 causing rotation of the gear 19 brings about rotation of the gear 30 with which said gear 19 meshes. Oil or other hydraulic medium taken into the pump casing 10 as from a pipe 37 is carried around between the teeth of these gears and forced out into a pipe 38 by the meshing of the gears. Since the gears are of fixed cross sectional dimensions the amount of oil pumped per revolution of said gears is proportional to the distance measured parallel to their axes and over which distance said gears are in mesh. This distance and hence the effective gear mesh or capacity of the transmission is varied by sliding the gear 30 along the rod 25 as will be hereinafter more fully considered.

Leakage of the hydraulic fluid about or past the ends of the gears 19 and 30 is prevented by means now to be described. A carrier 39 fits flat against the inner and forward end of the gear 30 which, as best shown in Fig. 7, is held to said carrier by means of an axial thrust bearing 40 held in place and adjusted in tension by means of a ring 41 threaded around the forward or inner end of a reduced diameter neck portion 42 of the gear. In its upper portion the carrier has a round hole 43 bored therethrough in concentric relation with the axis of the gear 19 and such hole is somewhat larger than the outside or major diameter of said gear. Therefore, the carrier 39 and the gear 30 attached thereto may slide parallel to the axes of the gears without in any way interfering with the rotation of the gear 19.

A sealing ring 44 which has a close fit in but is rotatable in said hole 43 is fitted with an axial thrust bearing 45 held in place and adjusted in tension by a bearing ring 46 threaded to the carrier 39. The inner face of the sealing ring 44 is flush with the inner face of that portion of the carrier 39 which is flat against the forward end of the gear 30. Internally, the sealing ring 44 is provided with teeth (see particularly Fig. 10) cut to conform closely enough to the surfaces of the teeth of the gear 19, which said ring surrounds, to restrict oil leakage as much as possible and still permit said ring to slide longitudinally of said gear without excessive friction.

Thus, it will be understood that the ring 44 slides with the carrier 39 which mounts it and also that said ring is rotatable in the carrier or in the opening 43 in the carrier with the gear 19. In transverse section (Figs. 8, 9 and 10) the carrier 39 conforms closely to the inside dimensions of the casing 12 and it will be appreciated that very little oil or other hydraulic fluid is permitted to leak past the carrier or between the carrier and the casing.

An internally toothed sealing ring 47 (Figs. 6, 7 and 8) fits around and rotates with the gear 30 in the same manner that the ring 44 fits around and rotates with the gear 19. However, the sealing ring 47 is mounted in the casing 12 and is held in place by an axial thrust bearing 48 and a bearing retaining ring 49 threaded to the casing. Thus the sealing ring 47 is held against any sliding movement but is rotatable with the gear 30 and the latter may move through said ring.

Figure 8:
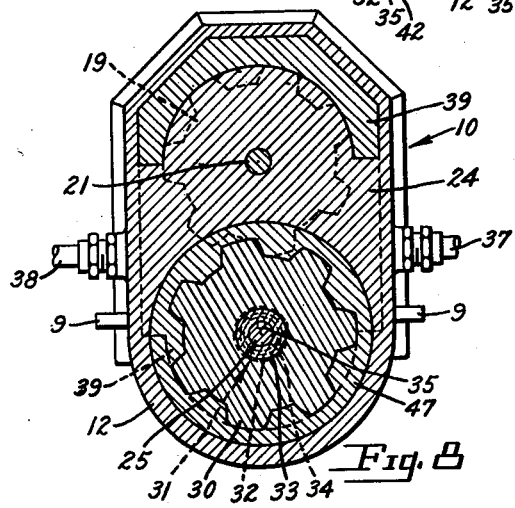
Fig. 8 is a vertical sectional view taken as along the plane of the line 8—8 of Fig. 7.

The inner face of the sealing ring 47 is flat and is flush with the inner face of the crosspiece 24 against which the rear end of the gear 19 abuts in a flat-to-flat relationship. That part of the carrier 39 which comes in contact with the outer peripheral surface of the gear 19 slides in and conforms closely to a space 50 provided above the crosspiece 24 as shown in Figs. 7 and 8. Thus very little oil is permitted to leak past the crosspiece 24 or the sealing ring 47. A suitable packing 51 is provided about the shaft 21 where it passes through the plate 22 so as to prevent leakage of oil at such point.

When the present mechanism is in use, oil is pumped from the variable capacity pump 10 out through the pipe 38 to the four-way valve 15. This valve is manually operated or controlled by a rod 52 integral with or rigidly secured to a pair of similar pistons 53 and 54 located within the valve casing or housing 55. By manipulation of the rod 52 the pistons 53 and 54 may be moved into any of four different positions to give a forward drive, a neutral drive, a brake position and a reverse drive.

With this valve 15 in brake position, as illustrated in Fig. 3, oil or other hydraulic fluid entering the valve casing from the pipe 38 passes directly into a pipe 56 which is in communication with the interior of said casing 55 adjacent the two ends thereof, as at 57 and 58. Thus (see Fig. 2) the pipe 56 at its valve end is bifurcated or includes a pair of portions or branches 59 and 60 communicating respectively with the openings 57 and 58 from the casing. The pipe 56 leads directly back to the storage sump 14 in the lower portion of the casing 13.

From this storage sump 14 the oil or other hydraulic fluid moves via the pipe 37 back into the pump 10 from whence the cycle is repeated. Sump 14 is sealed and is equipped with two threaded plugs 62 and 63 which are used for filling and draining respectively. A partition 64 serves to seal off the sump 14 from the upper chamber 65 within the casing 13 and which upper chamber comprises the chamber receiving the control unit per se. A plug 66 provides for draining of the lubricating oil from said upper chamber 65. Pipes 67 and 68 are arranged to connect the interior of the valve casing 55 of the four-way valve 15 with the driven unit 16.

In the brake position of the valve 15, the terminals of pipes 67 and 68 are blocked by the pistons 53 and 54 respectively and thus no oil flows through said pipes 67 and 68 to the driven unit 16 with which they are connected. The forward drive of the unit 16 is obtained by moving the valve control rod 52 as far as possible into the valve casing. In this position, oil pumped into the valve casing 55 through the pipe 38 passes to the driven unit 16 via the pipe 67 and returns to the valve via pipe 68 and hence into the pipe 56, through the port 58 and branch 60, and back to the sump 14 to be again drawn out through the pipe 37 by the pump 10. Thus, in this forward drive, the oil is flowing through the driven unit 16 from the pipe 67 to the pipe 68.

The reverse drive is obtained by moving the valve control rod 52 (see Fig. 3) further out of the housing or valve casing 55, thus causing the oil which enters from the pump through the line 38 to flow out through the pipe 68 through the driven unit 16 and thence back through the pipe 67 into the valve casing 55 at the left side of piston 53 through port 57 to branch 59 and through the pipe 56 to the sump 14. From the sump, the oil or other hydraulic fluid is taken back into the pump through the pipe 37 and the cycle continued. From the foregoing, it will be understood that the forward or reverse drive depends on the direction in which the oil or other fluid under pressure or hydraulic medium is passed through the driven unit 16.

Neutral drive is obtained by placing the valve rod 52 in a position half way between that of the forward and brake positions above described. In neutral position all pipes 38, 67, 68 and 56 are hydraulically connected to each other as oil is free to flow around the piston 54 through a widened portion 69 of the valve casing 55. Leakage of the hydraulic medium from the valve 15 about the valve rod 52 is prevented by a packing or stuffing box arrangement including a packing 70 held under pressure by a plug 71 threaded into an end plate 72 of the valve casing. It will be understood that pipe connections other than those illustrated may be employed in making up the pipe arrangements required by the present transmission.

Any mechanical device or devices capable of converting hydraulic energy into mechanical energy and operating under positive hydraulic pressure may be used as the driven unit or units of this transmission. For the purpose of illustration, the driven unit 16 is a simple gear type pump or device. The same consists of a casing 73 receiving two meshing gears 74 and 75 mounted in any suitable manner as on shafts 76 and 77 of which the latter may protrude as shown to form a driving connection.

By the familiar hydraulic gear motor principle, oil or other hydraulic medium flowing through the unit 16, as from the pipe 67 to the pipe 68 or from the pipe 68 to the pipe 67, causes the gears 74 and 75 to rotate and hence rotate the transmission output shaft 77 which is rigid with one of said gears.

In the remainder of this present description, the four-way valve 15 will be considered as in either forward or reverse drive position, the neutral and brake positions being ignored. The effective speed ratio of the transmission is here considered to be the ratio of angular velocities of the driven unit output shaft 77 to the angular velocity of the revolving elements of the variable capacity pump 10 driven by the prime mover (not shown). Since the output shaft 77 is ultimately driven by the variable capacity pump 10, the above mentioned ratio is the same as the ratio of the capacities of the variable capacity pump 10 and the driven unit 16. This may be explained in equation form as follows:

$$\text{Effective speed ratio} = \frac{\text{Angular velocity of driven unit (R.P.M.)}}{\text{Angular velocity of variable capacity pump (R.P.M.)}} = \frac{\text{Capacity of variable capacity pump (gal./rev.)}}{\text{Capacity of driven unit (gal/rev.)}}$$

Thus, the effective speed ratio can be changed by changing the capacity of the variable capacity pump.

As described herein, the pump 10 is used to hydraulically drive the fixed capacity hydraulic unit 16. However, reversing this procedure and using the unit 16 to drive the device heretofore referred to as the variable capacity pump 10 would not change in any way the novelty of the latter device or the control principles and mechanisms hereinafter described.

Any type of hydraulic pump delivering positive pressure and having two revolving elements rotating on parallel axes may be converted by similar methods to those described herein to serve as a variable capacity pump. Thereafter, the employment of any such device would not change the novelty of the variable capacity pump herein described.

For simplicity of illustration, a gear type pump (Figs. 6-10) is described herein. The teeth of the pumping gears would ordinarily be of the non-pulsating flow type of helical gears with a small helix angle. However, for simplicity, straight spur gear teeth are shown in the drawings.

At the respective ends of the pump are cavities or spaces 78 in the front end of the pump and 79 in the rear end of the pump. As previously explained in connection with the pump, oil leakage from the cavities opening into the pipes 37 and 38 to the cavities 78 and 79 at the ends of the pump is kept to a minimum. The small amount of oil (when oil is used as the hydraulic medium) that does leak past to the cavities 78 and 79 serves as a lubricant for the internal parts of the pump. A difference in oil pressure, as between the end cavities 78 and 79 of the pump 10, will cause the carrier 39 and the sliding gear 30 to move parallel to the gear axes and change the capacity of said pump.

This change to give a differential in pressure as between the cavities or chambers 78 and 79 is accomplished as follows: a reversing valve 80 (Figs. 4, 5, 11 and 12) is bolted or otherwise secured to the front wall or plate 22 of the pump housing 12 and is located within the casing or housing 13 of a control unit. A high pressure by-pass pipe 81 connects the high pressure line or pipe 38 to the valve 80. Both internal end portions of said valve are connected by pipes or nipples 82 with the low pressure sump 14. End cavity 78 of the pump 10 is connected to the valve 80 by a pipe 83 connected through the wall or plate 22 while a pipe 84 connects said valve with the chamber of cavity 79 in the other end portion of the pump casing.

Valve 80 (see Fig. 12) consists of a cylindrical housing 85 containing two identical sliding pistons 86 and 87 integral or rigid with a piston rod 88. When said pistons are in the neutral position in which they are shown in Fig. 12, no oil can flow to or from the valve. When, however, the piston rod 88 is pushed further into the valve 80 oil will flow through said valve from the high pressure by-pass line 81 to the pipe 83 and hence into the end cavity 78 of the pump. At this time, the opposite end cavity 79 of the pump is connected through the pipe 84, valve 80 and one of the pipes or nipples 82 to the low pressure sump 14. This differential in oil pressure in the cavities 78 and 79 caused by connecting cavity 78 to the high pressure outlet pipe 38 from the pump and the other end cavity of the pump to the low pressure sump 14 will cause the carrier 39 and the gear 30 to slide parallel to the gear axes and thus change the capacity of the pump 10 and hence the effective speed ratio of the transmission.

Since the application of pressure just described causes the carrier 39 and the gear 30 to move in a direction to reduce the distance, measured parallel to the gear axes, over which the gears 19 and 30 mesh, the capacity (volume flow per revolution) of said pump is reduced. Hence the effective speed ratio of the transmission as previously suggested is decreased. This ratio may be increased by withdrawing rod 88 as far as possible from the valve 80 and thus permitting some of the high pressure oil from pipe 38 to flow via pipe 81 into the valve 80 and hence out through the pipe 84 into the end cavity 79 of the pump 10. At the same time, oil or other hydraulic medium is by-passed from the end cavity 78 of pump 10 via pipe 83 through valve 88 and one of the nipples or pipes 82 into the low pressure sump.

A novel feature of this invention is that the pump 10 furnishes the hydraulic energy required for changing its capacity by having oil or other hydraulic medium by-passed from the high pressure pipe 38 (or the pump discharge side) and the low pressure (sump 14) side of its main pump circuit to its end cavities through the pipes 83 and 84 and the reversing valve 80. The operation of the valve 80 may be manual but I have disclosed and will hereinafter describe an automatic control for said valve for changing the effective gear mesh in the pump 10 according to principles to be hereinafter set forth.

By definition, the output power (brake horsepower) of a prime mover is the product of said prime mover's output shaft torque (ft. #) and angular velocity (R. P. M.) multiplied by a suitable conversion constant. Therefore, within the operating range of any particular prime mover there are a variety of possible combinations of output shaft angular velocity and torque for each particular output power requirement of said prime mover. However, one of these possible combinations, for any particular power output, is considered more desirable than any of the other combinations of torque and velocity for that same power output. The most desirable combination will usually be chosen as the one with the greatest fuel economy that is the point at which the engine consumes the least fuel for that particular power output. However, if operating the engine at this point will cause excessive mechanical wear, strain, or heating, some other combination or output shaft torque and angular velocity will be chosen as the most desirable.

When said most desirable combinations are plotted for all possible power output requirements of a given engine on a graph whose coordinates are output shaft torque and angular velocity, a curve is formed. Any combination of prime mover output shaft torque and angular velocity which does not fall on this curve is not the most desirable combination for the particular power output developed. In this invention, the said combination may be adjusted to fall on said curve by changing the capacity of pump 10. Since pump 10 is driven by the prime mover, decreasing said capacity will decrease the torque and thus cause an increase in the angular velocity of the output shaft of said prime mover. Likewise, increasing the capacity of pump 10 will increase said torque and cause a corresponding decrease in said velocity.

As just explained, whether a change in capacity of the pump 10 is desirable and if so the direction in which the change should take place is a matter of prime mover output shaft angular velocity and torque. According to the present invention, the required shift in the capacity of the pump 10 is accomplished by a manipulation of the reversing valve 80 through the control mechanism generally designated 11. As will later more fully appear, the operation is accomplished through a cam by means of a governor unit and torque gage mounted on the shaft 17 (to which the prime mover is connected) and thus respectively furnish a direct measurement of said prime mover torque and angular velocity.

As previously explained, the output shaft of the prime mover or a shaft driven by the prime mover is connected to rotate the shaft 17 as by being bolted or otherwise secured to the plate 18. This shaft 17 is rotatably received in and mounted by a bearing 89 formed with one end of the housing 13 and in a housing-like member 90. This housing or member 90 is rigidly held in place as by being supported from the side walls of housing 13 by means of rigid bars 91.

On the shaft 17 is a governor, generally designated 92, including forward arms 93 and 94 pivoted at 95 and 96, respectively, to a collar 97 fast on the shaft 17. The rear governor arms 98 and 99 are integral with weights 100 and are pivoted to the forward governor arms as at 101. Further, these arms 98 and 99 are pivoted as at 102 and 103 to a sleeve 104 which is keyed to slide along and to rotate with the shaft 17. A compression spring 105 exerts a force on the sleeve 104 and at its other end this spring is held in place by a washer 106 backed up by a pin 107.

A collar 108 fits over one end portion of the sleeve 104 and is mounted thereon by suitable anti-friction bearings as shown. Thus, said collar is movable along the shaft 17 with the sleeve 104 but the sleeve rotates within the collar and the latter does not rotate. Since the spring 105 resists the centrifugal force of the weights 100, the position of collar 108 is dependent only upon the angular velocity of the shaft 17 and thereby furnishes a direct measure of the angular velocity of the output shaft of the prime mover.

A sun gear 109 (Fig. 11) is fixed to the shaft 17. Arranged parallel with said sun gear 109 is a disc or spider 110 fixed on the shaft 21 which drives the pump 10 as above explained. The disc or spider 110 rotatably mounts four planetary pinions 111 in positions meshing with the sun gear and with the teeth of an internal or ring gear 112. Thus, rotation of the sun gear 109 causes the four planetary pinions 111 to roll around the inside of the ring gear 112 and thus rotate the spider or disc 110 carrying said planetary pinions and fixed on the shaft 21. Thus, it will be seen that the prime mover driving the shaft 17 functions to drive the pump 10 through the planetary reduction gear just described.

The ring gear 112 is mounted on the housing 90 and rotation of the ring gear about said housing is limited by lugs 13 which are integral with said gear striking against a lug 14 which is integral with or secured to the upper wall of the casing 13. A cam 115 is integral with the ring gear 112 and rotation of the ring gear and cam is resisted by a coil spring 116 which is secured at one end to the gear 112 as at 117 and at its other end to a wall of the casing 13, as at 118. Thus, the rotary position of the gear 112 depends only upon the torque of the shafts 17 and 21. A cam rod 119 (Figs. 4 and 5) is held against the cam 115 by means of a coil spring 120 acting against a plunger 121 which slides in the upper portion of the housing 90 and actually comprises a portion of rod 119 being integral therewith.

An upstanding lug 122 is integral with the plunger 121 and thus the position of said lug is dependent upon the prime mover output shaft torque. This is true since the lug is carried by the plunger 121 the position of which is determined by the cam 115 integral with the ring gear 112 whose position depends upon the torque of the shafts 17 and 21 and thus on that of the prime mover output shaft.

A rod or link 123 is pivoted to the collar 108 at 124 and a second rod or link 125 is pivoted to the lug 122 as at 126. Additionally, these rods or links at their other ends are pivoted to one another by rod 127 passing through a cam slot 128 in a cam plate 129. Such plate is rigid with a shaft 130 pivotally mounted at its respective ends in bearing elements 131 carried by the side walls of the casing 13. Rigid with the shaft 130 is a bar 132 arranged vertically and having its lower end portion connected with the outer end of the piston rod 88 by a pin and slot or other suitable connection, as suggested at 133.

With this construction it will be seen that any rotation or movement of the cam plate 129 about the axis provided by the shaft 130 will cause said shaft to rotate and thus actuate the bar 132 so as to cause the piston rod 88 to be moved off its neutral position whereby to supply fluid under pressure to one or the other of the cavities 78 and 79 in the respective ends of the pump casing whereby to shift the carrier 39 and the gear 30 to change the capacity of the pump as heretofore set forth in detail. The suggested rotation or pivotal movement of the cam plate 129 will result when the pivot 127 between the links 123 and 125 tends to a movement other than one following the contour of the cam groove or slot 128.

This cam slot 128 is so constructed that when the piston rod 88 is in its neutral position every possible position of the pivot 127 along said slot, and hence the position of the collar 108 and the lug 122, and hence the prime mover output shaft angular velocity and torque are in the most desirable combination, as previously determined and heretofore described in detail, for the particular power output of the prime mover at that time. On a change in conditions, the automatic control device herein described will adjust the pump to meet such conditions, as for example a change in resistance made by the output shaft 77 of the driven unit 16.

Assume the prime mover to be driving the pump at a constant speed through the shafts 17 and 21 and the disclosed planetary reduction gear. Also assume pump 10 to be pumping oil or other hydraulic fluid through the driven unit 16 at a constant speed to meet the constant torque resistance on the transmission output shaft 77. Further, assume that the prime mover output shaft torque and angular velocity are in any combination that will place pivot 127 in the cam slot 128 while the cam plate 129 and hence the rod 88 of the reversing valve 80 are in the neutral position as previously described. In said position, no oil is by-passed to or from either of the end cavities 78 and 79 of the pump and the pump remains locked in capacity—that is, the pump 10 is pumping a fixed amount of hydraulic fluid per revolution.

Let us now suppose that an increased torque resistance is externally applied to the output shaft 77. This will tend to slow the angular velocity of the gears 74 and 75 and thus increase the fluid pressure in the pipes carrying oil between the pump 10 and said unit 16. This increase in fluid pressure acting within the pump 10 increases the torque resistance of the gears 19 and 30 and the shaft 21. Such increased torque resistance through the planetary reduction gear and the torque gage moves the lug 122 and at the same time causes shaft 17 to decrease in angular velocity. Said decrease in angular velocity of the shaft 17 causes the collar 108 to be moved by the centrifugal governor 92.

The described movement of the collar 108 and the lug 122 causes the pivot 127 to exert pressure on a side of the cam slot 128 and thus impart a rotary or turning movement to the cam plate 129. When this occurs, the rod 132 is actuated and actuates the piston rod 88 in a direction to cause the reversing valve 80 to by-pass hydraulic fluid in such a way as to cause a decrease in the capacity of the pump 10. As above explained, this is accomplished by having a higher pressure in the cavity 78 so as to move the carrier 39 and gear 30 toward the right, as viewed in Figs. 6 and 7.

This decrease in capacity of the pump 10 is due to the fact that less of the gears 19 and 30 are exposed to the high pressure oil being pumped and thus there is a decrease in the torque resistance on the shaft 21. This decrease will cause the lug 122 to tend to resume its original position and at the same time allow an increase in angular velocity of the shafts 17 and 21 whereby to cause the collar 108 to tend to resume its original position under the influence of the governor 92. These latter movements of the collar 108 and the lug 122 cause the pivot 127 to rock the cam plate 129 and hence the bar 132 and piston rod 88 back to neutral position and thus again lock the pump 10 in capacity until a further change in capacity is initiated by prime mover output shaft conditions.

The changes having taken place as described, if there has been no adjustment of the fuel throttle of the prime mover, the latter will be operating at its original output shaft torque and angular velocity. However, if the capacity of the pump 10 has been decreased, the driven unit output shaft 77 will be revolving at a lower velocity than before the adjustments were made in the pump by the control mechanism. The power output of the shaft 77 is essentially unchanged, however, as said shaft is meeting an increased torque resistance. If this decrease in transmission output shaft angular velocity is considered undesirable, the operator of the prime mover or a throttle speed governor of said prime mover can open wider the fuel throttle and thus increase the output power.

A decrease in torque resistance on the output shaft 77 of the unit 16 would be handled entirely automatically in a similar manner to that just described for an increase in said torque. Under such conditions, the cam plate 129 would be turned or tilted in the opposite direction and the piston rod 88 shifted in the opposite direction so that the increase in pressure would take place in the cavity 79 of the pump. In this connection it is noted that in Figs. 6 and 7 the relationship of the gears 19 and 30 is that at which, or is substantially that at which, the pump is operating at maximum capacity.

From the above, it will be seen that the complete automatic control of the effective speed ratio of the transmission, based on engine performance characteristics, is accomplished. The use of more complicated control mechanisms such as two reversing valves mechanically and hydraulically linked together to reduce shocks resulting from sudden changes in the capacity of pump 10 would not change the novelty of the control principles herein described. Further, reducing the flow of hydraulic fluid required to cause a change in capacity of the pump 10 by connecting the pipes 83 and 84 to small pistons, which would actuate gear 30 axially instead of connecting said pipes to the end cavities 78 and 79 of the pump 10 would not introduce any novelty.

As herein disclosed, only the control mechanism, with the exception of its reversing valve, contains moving parts which are not immersed in oil and hence need additional lubrication. This could be supplied by any of the well known methods such as the splash or any of the various pressure systems. If pressure lubrication of said parts is used, no additional oil pump is necessary as the pressure may be supplied by the pump 10 or the prime mover's lubrication pump forcing oil through the axial hole (not shown) in the shaft 17.

The variable capacity pump described herein need not be used with the control mechanism herein disclosed. For example, the centrifugal governor, torque gage and reversing valve could be dispensed with and one or more springs inserted in an end cavity of the pump 10. Said springs would tend to slide gear 30 and carrier 39 so as to always increase the capacity of the pump 10. The cavity containing said springs would be permanently hydraulically connected to the low pressure side of the main hydraulic circuit—that is, to pipe 56 or directly to sump 14.

The opposite end cavity of the pump would be permanently connected to the high pressure line carrying fluid from the pump to the driven unit. Thus, an increase in torque resistance on the transmission output shaft 77 would cause an increase in pressure in the high pressure line and hence said pressure would drive carrier 39 and gear 30 against the force of said springs to reduce the capacity of the pump 10. This latter system takes no account of velocity and hence would probably be used only with a constant velocity prime mover.

Having thus set forth the nature of my invention, what I claim is:

1. In a hydraulic transmission, a pump including a pair of rotatable meshing elements having parallel axes, means mounting one of said elements for axial movement relative to the other thereof to change the effective gear mesh of said pump, a shaft to be driven by a prime mover, a planetary reduction gear torque gage and a centrifugal governor device mounted on said shaft to be driven by a prime mover, said planetary reduction gear connected to drive one of the elements of said pump from said shaft to be driven by the prime mover, said pump having a cavity at each of its ends adapted to receive fluid under pressure to shift one of the pump elements axially relative to the other thereof to change the gear mesh of the pump, a hydraulic reversing valve selectively controlling the delivery of fluid under pressure to said cavities, and cam means controlled by said torque gage and centrifugal speed governor jointly and in turn controlling said reversing valve.

2. In a hydraulic transmission, a pump including a pair of elongated meshing gears arranged on parallel axes, a shaft mounting one of said gears for driving the same, means mounting the other gear for axial movement relative to the first gear to change the effective gear mesh and thus the capacity of said pump, a control mechanism including a shaft to be driven by a prime mover, a planetary reduction gear between said driven shaft and the first mentioned shaft and including a ring gear, a speed governor on said driven shaft, a cam movable in accordance with turning movement of the ring gear of said planetary reduction gear, a spring resisting such movement of said cam and ring gear, a plunger shiftable by said cam on movement of the latter, a cam plate, means connecting said cam plate with said speed governor and said plunger through a pin and cam slot connection, means mounting said cam plate for tilting movement when the combined movements of said plunger and speed governor attached links cause the pin to press against a side of said cam slot, and means controlled by the tilting movement of said cam plate and causing axial movement of said slidable elongated gear to change the effective gear mesh of the elongated gears of said pump and thus the capacity of the latter.

3. The hydraulic transmission as in claim 2 wherein the last named means includes a reversing valve and connections for delivering fluid under pressure selectively to the respective ends of said axially movable gear.

4. The combination as in claim 1 wherein the fluid for delivery to said cavities is from the pressure side of said pump.

5. In a hydraulic transmission, a pump including a pair of rotatable meshing elements having parallel axes, means mounting one of said elements for axial movement relative to the other thereof to change the effective gear mesh of said pump, a shaft to be driven by a prime mover, a planetary reduction gear torque gage and a centrifugal governor device mounted on said shaft to be driven by a prime mover, said planetary reduction gear having its output connected to drive one of the elements of said pump and its input connected to said shaft to be driven by the prime mover, said pump having a cavity at each of its ends adapted to receive fluid under pressure to shift one of the pump elements axially relative to the other thereof to change the gear mesh of the pump, a hydraulic reversing valve selectively controlling the delivery of fluid under pressure to said cavities, and means controlled by said torque gage and centrifugal speed governor jointly connected to said reversing valve.

6. In a hydraulic transmission, a pump including a pair of rotatable meshing elements having parallel axes, means mounting one of said elements for axial movement relative to the other thereof to change the effective gear mesh of said pump, a shaft to be driven by a prime mover, a planetary reduction gear torque gage and a centrifugal governor device mounted on said shaft to be driven by a prime mover, said planetary reduction gear connected to drive one of the elements of said pump from said shaft to be driven by the prime mover, and means controlled jointly by said torque gage and centrifugal speed governor for shifting one of the pump elements axially relative to the other thereof to change the gear mesh of the pump.

7. In a hydraulic transmission, a pump including a pair of rotatable meshing elements having parallel axes, means mounting one of said elements for axial movement relative to the other thereof to change the effective gear mesh of said pump, a shaft to be driven by a prime mover, a planetary reduction gear torque gage and a centrifugal governor device mounted on said shaft to be driven by a prime mover, said planetary reduction gear connected to drive one of the elements of said pump from said shaft to be driven by the prime mover, said pump having a cavity at each of its ends, a hydraulic reversing valve selectively controlling the delivery of fluid under pressure from said pump to said cavities, and means jointly controlled by said torque gage and centrifugal speed governor connected to said reversing valve.

8. In a hydraulic transmission, a unit including a pair of rotatable meshing elements having parallel axes, means mounting one of said elements for axial movement relative to the other thereof to change the effective gear mesh of said unit, a shaft to be driven by a prime mover, a torque gage and a centrifugal governor device mounted on said shaft, a driving connection between said shaft and one of the elements of said unit, and means controlled jointly by said torque gage and centrifugal speed governor for shifting one of the unit elements axially relative to the other thereof to change the gear mesh of the unit.

9. In a hydraulic transmission, a hydraulic power unit having a variable capacity and including a driven element and a movable capacity-varying element, a shaft drivable by a prime mover, a driving connection between said shaft and said driven element, a movable torque sensitive means cooperatively connected between said shaft and said driven element sensitive to torque differential between said shaft and driven element, a movable speed sensitive means cooperatively connected to said shaft, and movable means operatively connected to and controlled jointly by said torque and speed sensitive means and operatively connected to said capacity-varying movable element to activate the latter according to a predetermined pattern.

FRANK M. PERKINS.

REFERENCES CITED

The following references are of record in the file of this patent:

UNITED STATES PATENTS

| Number | Name | Date |
| --- | --- | --- |
| 788,848 | Riegel | May 2, 1905 |
| 1,216,243 | Marsh | Feb. 13, 1917 |
| 1,775,856 | Hauser | Sept. 16, 1930 |
| 1,787,565 | Brown | Jan. 6, 1931 |
| 2,149,326 | Wilkin | Mar. 7, 1939 |
| 2,291,011 | Vickers | July 28, 1942 |
| 2,382,389 | Benedek | Aug. 14, 1945 |
| 2,406,965 | Orr | Sept. 3, 1946 |